Aug. 30, 1960    S. H. CALDWELL    2,950,800
IDEOGRAPHIC TYPE COMPOSING MACHINE
Filed Oct. 24, 1956    6 Sheets-Sheet 1
Fig. 1
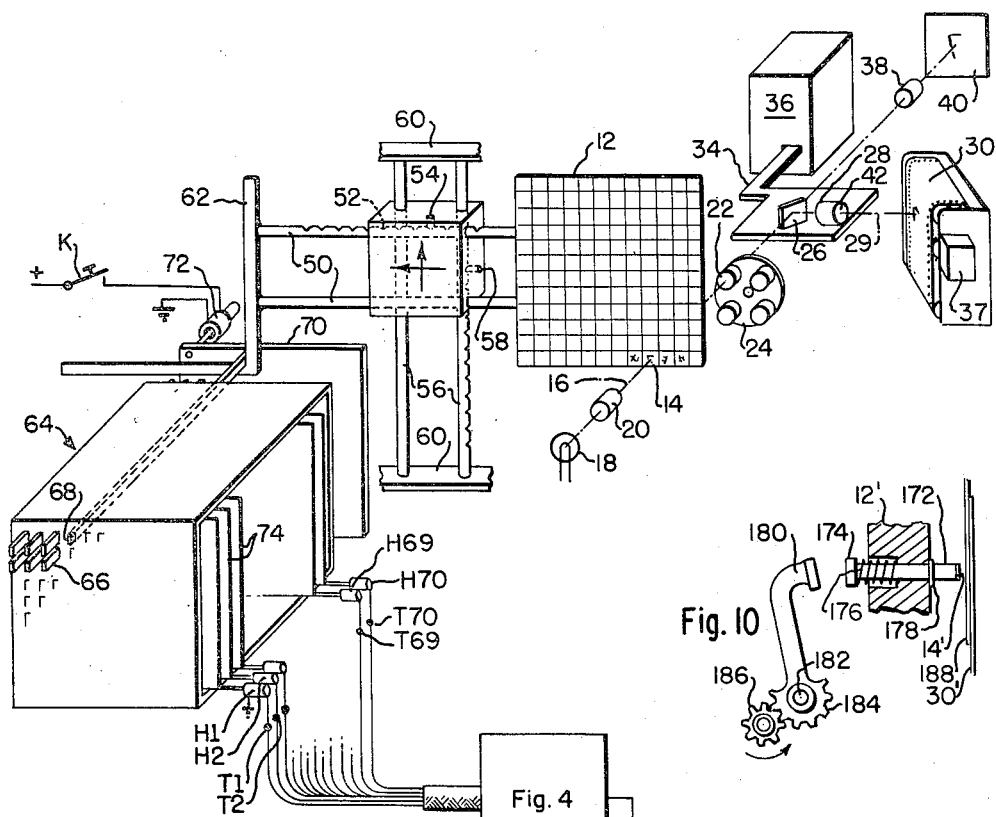
Fig. 9
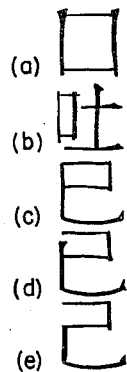
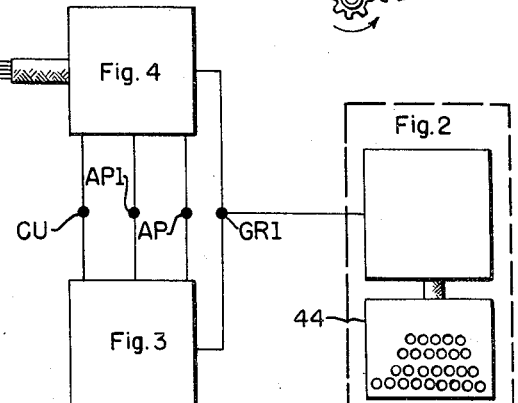
INVENTOR.
SAMUEL H. CALDWELL
ATTORNEYS Aug. 30, 1960  S. H. CALDWELL  2,950,800
IDEOGRAPHIC TYPE COMPOSING MACHINE
Filed Oct. 24, 1956  6 Sheets-Sheet 5

INVENTOR.
SAMUEL H. CALDWELL
ATTORNEYS

Aug. 30, 1960  S. H. CALDWELL  2,950,800
IDEOGRAPHIC TYPE COMPOSING MACHINE
Filed Oct. 24, 1956  6 Sheets-Sheet 6

INVENTOR
SAMUEL H. CALDWELL
BY
ATTORNEYS

United States Patent Office 2,950,800
Patented Aug. 30, 1960

2,950,800

IDEOGRAPHIC TYPE COMPOSING MACHINE

Samuel H. Caldwell, Watertown, Mass., assignor to Graphic Arts Research Foundation, Inc., Cambridge, Mass., a corporation of Delaware Filed Oct. 24, 1956, Ser. No. 618,121

14 Claims. (Cl. 197—1)

The present invention relates generally to the art of type composition, and more particularly to machines adapted for selection of a complete typographical character by multiple-key operation, as distinguished from selection of alphabetic components by single-key operations as in conventional type composition.

Nearly all of the advancements of mechanization in the type composing art have been made to facilitate composition in languages having relatively few distinct typographical characters as compared with the numbers of comparable characters in ideographic languages, such as Chinese. For example, a typical font of characters for English composition including upper and lower case alphabets, the numerals and commonly-used punctuation consists of approximately seventy-five characters, and if provision is made for italics the total is approximately 140 characters. In contrast to this, the Chinese language includes a workable minimum of about 8,000 typographical characters for acceptable printing, and up to 20,000 and more characters for refined work, with no allowance for a variety of styles and sizes.

The technical implications of this large number of characters with reference to the mechanization of type composition have long been appreciated. It has also been recognized that the structures and modes of operation of conventional typesetting machines used for Western European langauges cannot be efficiently adapted by a mere change of scale to the composition of Chinese or similar languages. For example, it is obviously impractical to provide a keyboard having a key for each typographical character. The selection of a desired character is therefore necessarily dependent upon a plurality of key operations wherein the combination of selected keys uniquely defines the character desired.

Hitherto, it has been recognized that a form of multiple-key operation may be based upon analyzing the characters into groups according to their structural content. For example, in U.S. Patent 2,613,795 to Yutang, use is made of a classification of Chinese characters into smaller groups by referring to the configuration of the strokes at the top of each character and the configuration of the strokes at the bottom of the character. The patent further states that the greater part of the characters making up the written Chinese language can be formed from about 70 to 80 left-hand components, each forming a classifier, and about 1300 right-hand components, each forming a phonetic. The left-hand and right-hand components are combined to select the desired characters.

The difficulties encountered by the proposals of Yutang and proposals of like nature arise from a combination of factors, preeminent among which is the necessity on the part of the machine operator for memorizing a complex set of rules for operation of the machine, these rules being extraneous to an ordinary knowledge of the written language. Furthermore, in the interest of reducing the complexity of mechanism, it is necessary to make certain comprises, for example, by reducing the number of available characters. At best, the proposed machines are extremely complex and expensive to construct and maintain, especially where the operation is fundamentally mechanical. As a result, Chinese type is universally handset today from voluminous magazines following methods comparable to those used in the West prior to 1880.

Recent advances in the field of photographic type composition suggest the application of such methods to the composition of Chinese and similar languages, especially as a substitute for costly foundry type. Also, a photographic typesetting plate is not subject to mechanical deterioration as is foundry type.

The primary object of this invention is to provide an easy-to-operate type composing machine for Chinese and other similar ideographic languages, whereby the selection of each typographical character is made by a multiple-key operation, the keys being operated in a sequence which duplicates the sequence of strokes used in writing the character by hand, this sequence being dependent, therefore, on only an ordinary knowledge of the written language.

Another object is to provide a new and improved keyboard-operated or equivalent selection apparatus suitable to provide selection of ideographic characters, whether such characters be formed ultimately by photographic means, by typewriting, or by any other reproducing process.

Still another object is to utilize ideally simplified apparatus for the composition of ideographic languages. In this respect, it is desired to provide code means for the designation of each selected typographical character, such code means being adapted to reach a high state of efficiency and simplification through recognition of the frequencies of recurrence of certain characteristics in written or printed composition.

With the foregoing and other objects in view, the features of the invention comprise an improved type composing machine provided with a relatively small number of input keys or comparable circuits that are selectively operated in succession to produce a code uniquely designating each selected typographical character.

For illustration, the following description of a preferred embodiment has specific reference to the Chinese language, wherein a complete typographical character is referred to for brevity as an "ensemble." Each ensemble is analyzed into a plurality of "symbols." The symbols are the elemental strokes or frequently-used combinations of the elemental strokes (such combinations being called "entities") that are successively formed in writing the characters by hand, or special instructions used to differentiate ensemblies involving similar stroke sequences. The input keys or comparable circuits correspond to the respective symbols.

A feature of the machine resides in utilizing the fact that the writing of an ensemble is accomplished by marking the component symbols in a particular recognized sequence. It is found that Chinese writing can be analyzed into 21 distinct elemental strokes, disregarding the position and the scale of each stroke within the body of a character. I provide a key for each stroke, and I preferably include four additional special instruction keys, and keys for each of six additional multiple-stroke combinations ("entities") that are used with great frequency, to make a total of 31 symbol keys in all. In the machine described herein I have assumed but six entities, but it will be readily apparent that the number may be increased or decreased arbitrarily, or if desired I may provide only as many distinct symbols and corresponding keys on the key board as there are elemental strokes.

The selection of a given ensemble therefore requires, in general, the sequential depression of the keys corresponding to the component symbols in that order which would be followed in handwriting. Thus specialized training of the machine operator is vastly reduced as compared with other previously proposed typesetting machines. In certain ambiguous cases, a simple procedure is provided to distinguish characters that have similar stroke sequences from one another.

Another feature resides in providing binary code means operated by the keys for representation of each symbol. The number of digits used to express a stroke or special instruction is dependent upon the frequency of its use, being two for the one most frequently used and 12 for the one least frequently used. The code for each entity is simply a combination of the component stroke codes, and may have a maximum of 17 digits. Depression of a succession of symbol keys in the machine produces a composite binary number uniquely representing a selected ensemble, this number consisting of the serially-arranged binary numbers expressing its component symbols.

According to another feature, the number of key actuations that are necessary to produce a binary number uniquely defining a desired ensemble is frequently materially less than the total number of symbols of which the ensemble is actually composed. In such a case only sufficient keys need be actuated to distinguish the ensemble, and it is found in practice that this entails the production of a composite binary number not exceeding 70 digits in length, in any case.

As stated above, each available ensemble is represented by a unique binary number. Entry of this number at the keyboard may be used in various ways to select the corresponding ensemble for reproduction. Preferably, I provide mechanism for two-dimensional selection of ensembles arranged on a photographic plate in rows and columns, the selection being based upon the movement of a separate locator member corresponding to each desired ensemble on the plate. The movement of a selected locator member is intiated by the distinguishing binary code entered at the keyboard or equivalent input circuit and is carried out by means of selective actuation of "barrier" elements arranged to interfere with the locator members.

Other features of the invention reside in certain details of construction and modes of operation that will become apparent from the following description of a preferred embodiment and certain alternatives thereto, having reference to the appended drawings illustrating the same.

In the drawings,

Fig. 1 is an oblique, partially diagrammatic view illustrating the component parts of the machine;

Fig. 9 is a view showing certain typographical characters referred to in the description of the "special instruction keys"; and Fig. 10 is an elevation in section showing an alternative form of character matrix support for typewriting, and the associated hammer mechanism.

General description

Figure 2:
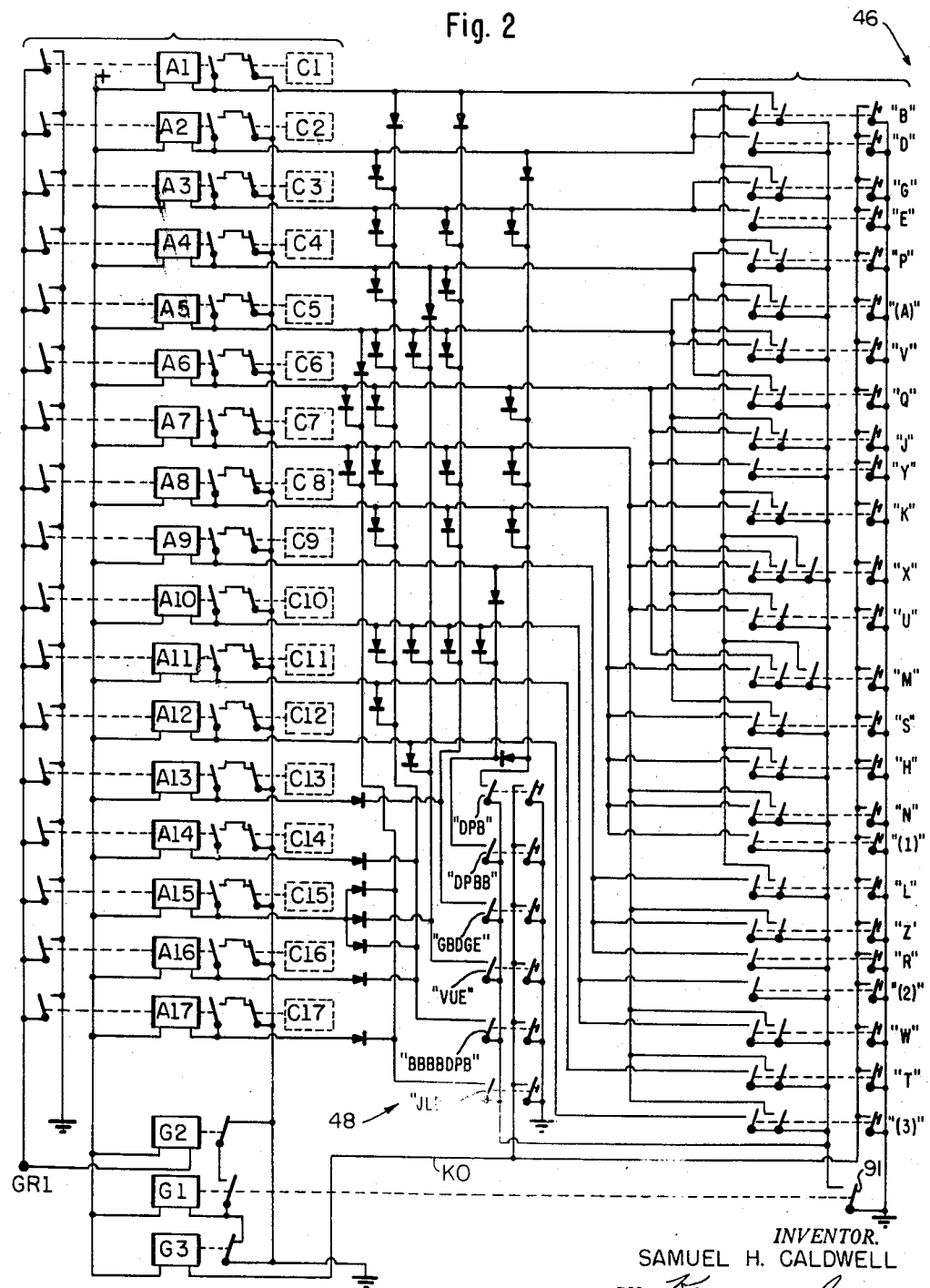
Fig. 2 is a circuit diagram of the keyboard-actuated binary symbol entry circuit.

Referring to Fig. 1, a preferred form of machine for composing Chinese type according to the invention is shown in partially diagrammatic form. A character plate 12 bearing all of the selectable ensembles such as 14 arranged in rows and columns is supported for horizontal and vertical movement in the plane of the ensembles. It will be understood that in actuality the support 12 contains several thousands of ensembles. For example, in the actual machine there may be 100 rows and 100 columns, while only 12 rows and 12 columns are shown for clarity of illustration. The support is preferably a glass plate upon which the ensembles are developed as transparencies. By movement of the support, a selected ensemble is brought to a projection axis 16. A continuous light source 18 illuminates the ensemble through a condensing lens 20, and the image is projected through a selected lens 22 on a rotatable lens turret 24, and is partially reflected from an incompletely silvered mirror 26 through a lens 28 on an axis 29 to a sheet of sensitized film 30. The various lenses on the turret 24 have differing magnifications to permit composition in the desired point size. Each of the lenses on the turret 24 is a compound collimating lens, whereby the light reaching the mirror 26 is parallel. The axis 29 is at right angles to the axis 16 and intersects the film 30 normally to its surface. The mirror 26 and lens 28 are supported on a support 34 that is moved along the axis 16 by an escapement mechanism 36 to space the successive ensembles in a line. The spacing between successive lines is produced by an escapement 37 that advances the film intermittently after each line is completed. It will be understood that the lines of Chinese text may be arranged on a page either in columns or in rows. The distance between the lens 28 and the film 30 is constant. The lens 28 receives the reflected parallel light from the mirror and focuses it upon the film regardless of the lateral position of the image. The optical projection system is of the form shown in my U.S. Patent 2,670,665, wherein a more complete description thereof is given.

A portion of the projected light passes through the mirror 26 along a continuation of the axis 16, and is focused by a lens 38 upon a viewing sheet 40 of ground glass. The sheet 40 is positioned within the view of the machine operator and forms a visual indication of the ensemble that has been selected for projection. A shutter 42 is arranged to intercept the light reflected to the axis 29, whereby the exposure of the film occurs only after opportunity for a visual check has been provided.

The balance of the machine consists essentially of apparatus for moving the support 12 in two dimensions to select the desired ensemble. This mechanism is actuated by a keyboard 44, the keys of which include 25 stroke keys and special instruction keys 46 (Fig. 5) and six entity keys 48, each key except the special keys bearing an elemental stroke or combination of strokes found in Chinese writing. In general, to select a desired ensemble, the operator merely depresses the keys successivly in the same order in which the corresponding strokes or entities would be written by hand. After a sufficient number of keys have been depressed to distinguish the ensemble desired from any of the others on the support 12, the mechanism for moving the support is automatically actuated and the image of the selected character is presented on the viewing sheet 40. Ordinarily, this occurs before the operator has depressed all of the keys representing the strokes in the given ensemble. In ambiguous cases, the operator depresses selected special keys, further described under a separate sub-heading below.

The support 12 is rigidly supported on a pair of parallel bars 50, the bars 50 being slidably supported within a housing 52. One of the bars 50 is notched and provided with detent means 54 for accurately positioning the support 12 in the horizontal dimension, as illustrated.

The housing 52 is slidably supported upon a second pair of parallel bars 56, one of the bars 56 being notched to cooperate with detent means 58 for positioning the support 12 accurately in the vertical dimension. The bars 56 are rigidly secured to fixed frame members 60.

An L-shaped seeker 62 is secured to the ends of the bars 50 with its legs respectively oriented parallel to the columns and rows of ensembles on the support 12. The seeker 62 is disposed opposite one end of a locator assembly 64 slidably supporting a plurality of rows and columns of locator rods 66, each rod corresponding to a particular ensemble and being oriented in predetermined relationship thereto. The rods are individually spring-loaded to slide toward the seeker 62, but are restrained until selected by means within the locator assembly, hereinafter more fully described. Prior to the selection of an ensemble for projection, the seeker 62 is in a lower right-hand position where its arms subtend an arc that includes all of the rods in the locator assembly. Means are provided to release a selected rod such as 68, which moves past the plane defined by the legs of the seeker 62, coming to rest against a rod reset plate 70. Resilient means within the housing 52 are operative after the selected rod strikes the plate 70 to release the seeker and allow it to move leftwardly and upwardly until it is arrested in both directions by the selected rod, as illustrated in the drawing. The desired ensemble is then precisely located in both dimensions with respect to the optical system by the cooperation of the detent means 54 and 58 with the notches in the bars 50 and 56. It will be understood that these notches are very accurately spaced in the same manner as the ensembles.

After projection, the selected rod 68 is returned to its initial position by closure of a key K to energize a magnet 72, the armature of which moves forwardly and carries the plate 70. When the rod 68 has been returned to its initial position, restraining means within the locator assembly 64, hereinafter more fully described, hold it in position and the plate 70 is returned to its illustrated position preparatory to selection of the next ensemble. Prior to this resetting operation, the seeker 62 is retracted to its initial position so as to prevent obstruction of the rods.

Figure 6:
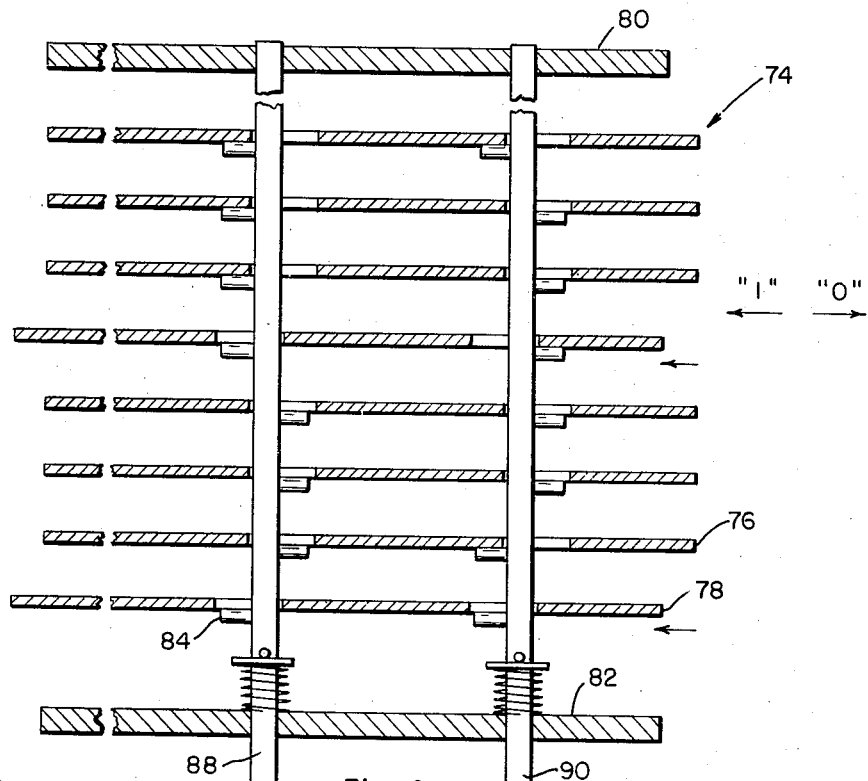
Fig. 6 is a partial plan view in section of the locator assembly showing the binary ensemble register and the locator rods for two representative ensembles.

The locator assembly 64 is provided with 70 barrier cards 74 comprising a binary ensemble register. The cards are identical, each card being slidable from a "0" position as indicated by a card 76 (Fig. 6) to a "1" position as indicated by a card 78. Each card is provided with a straight-sided vertical slot of uniform width extending the entire length of each column of rods 66. The rods 66 are slidably supported between fixed end plates 80 and 82 comprising the frame of the locator assembly. In either its "0" or its "1" position a card does not interfere with the longitudinal portions of the rods passing therethrough. However, each rod is provided with a set of laterally projecting pins such as 84 opposite certain cards, which may project from one side or the other of the rods. The pins may or may not interfere with the cards, depending upon the positions of the latter.

It will be apparent from the foregoing that a given rod is released only when the cards interfering with its respective pins are displaced in accordance with a code defined by the pins. This code is of the binary form. Thus the rod 88 is released only when the eight illustrated cards form the code "10001111." Similarly, a rod 90 is released only when the code registered by the cards is "11000001." In any case, for reasons that will become clear from the following description, it is arranged that the last digit of any symbol, and hence, of any ensemble is a "1." It will be understood that in actuality there are 70 cards in the complete ensemble register, only eight cards being shown for clarity of description. In the cases of most ensembles fewer than 70 pins are provided for the corresponding rods because codes of less than 70 digits are sufficient to distinguish them from others on the support 12.

The derivation of the codes defined by the pins on the rods 66 is accomplished as follows. For each selectable ensemble 14, one familiar with the writing of Chinese text may readily set forth the particular succession of strokes formed to write it. In certain cases described more fully below under the heading "Special Keys," where different ensembles have similar stroke sequences, one may adopt a limited number of "special instructions" to be placed in the succession of strokes to erase ambiguities. These instructions do not themselves correspond to strokes. The strokes and special instructions may be listed according to the order of their respective frequencies of use. Following a well-known method described in a paper by Huffman, entitled "A Method for the Construction of Minimum-Redundancy Codes," published in Proceedings of the Institute of Radio Engineers (September 1952), one may derive from this list a binary code for each stroke and special instruction which is characterized by certain properties: First, the number of digits in the code is a function of its frequency of use. Second, no code of any length is found as the initial sequence of a longer code. Third, because of the second property, a code representing an ensemble assembled by placing these stroke and instruction codes side-by-side with no intervening space significations does not confuse their separate identities; hence a particular ensemble can be unambiguously translated as a specific succession of stroke and instruction codes, and vice versa.

Since the Huffman method may produce a "0" as a final digit in some codes, the derived codes are arbitrarily altered so that the last digit is a "1" in every case. This is done by adding an extra digit "1" after each derived code ending with a "0".

Figure 8:
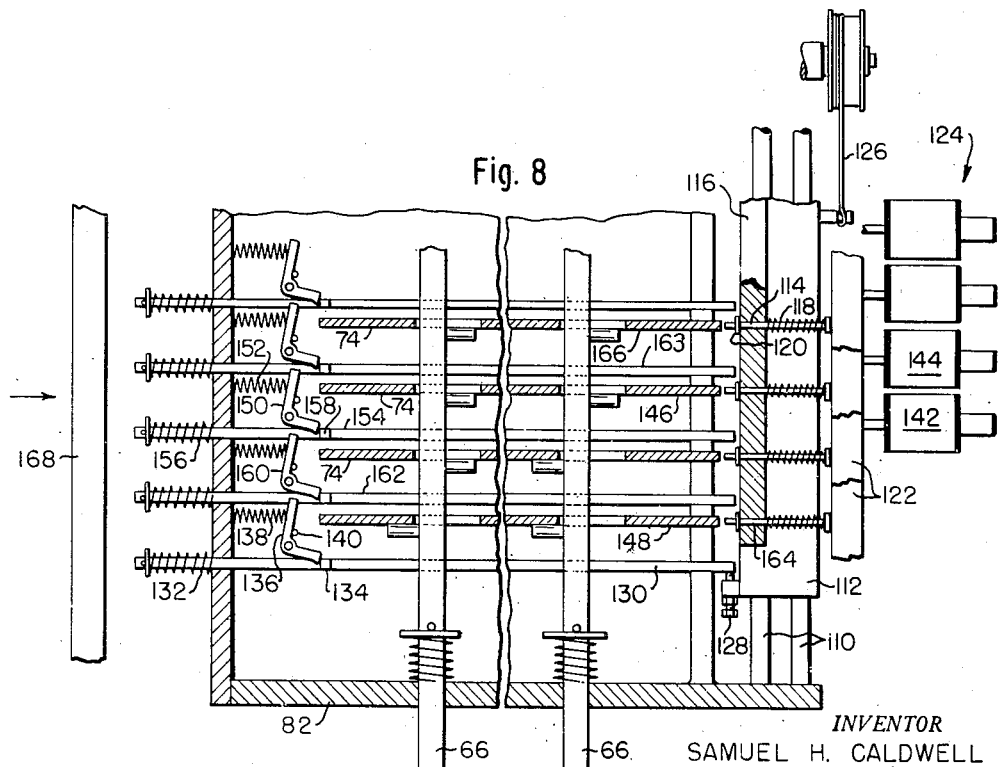
Fig. 8 is a plan view in section taken on line 8—8 of Fig. 7.

For each of the available ensembles the pins on the associated locator rod are arranged according to the code formed by the appropriate succession of stroke and instruction codes, left-hand pins as viewed in Fig. 8 representing "1's" and right-hand pins representing "0's." Only enough pins are placed in the rod to distinguish uniquely the particular ensemble. In any case, this will require not more than 70 pins. The mathematical basis for the codes is such that a text conforming with the assumed frequency distribution is represented by the least totality of binary digits, whereby a minimum quantity of selection equipment is required.

Figure 5:
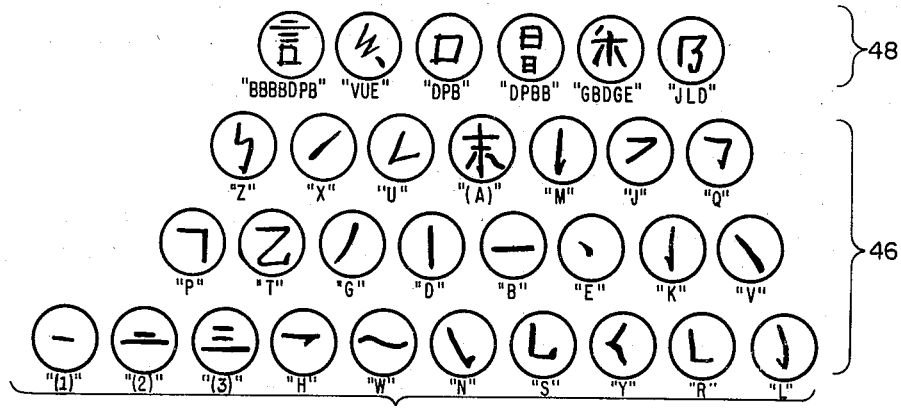
Fig. 5 is a view showing the symbols represented by the keys on the keyboard.

In the illustrated embodiment of the machine, I employ six entity keys 48 (Fig. 5), which may be depressed to select certain common stroke sequences; or, the operator may accomplish the same result by actuation of the stroke keys in the appropriate sequence. There are also four special instruction keys (A), (1), (2), and (3) designated by parentheses. Designating each stroke by a corresponding letter of the English alphabet as indicated in Fig. 5, the codes for the strokes and instructions, in descending order of frequency, are as follows:

| Stroke or special instruction | Code |
|---|---|
| B | 11 |
| D | 01 |
| G | 101 |
| E | 001 |
| P | 1001 |
| (A) | 10001 |
| V | 00011 |
| Q | 000101 |
| J | 000011 |
| Y | 000001 |
| K | 1000001 |
| X | 1000011 |
| U | 0000101 |
| M | 10000101 |
| S | 00001001 |
| H | 10000001 |
| N | 00000011 |

| Stroke or special instruction | Code |
|---|---|
| (1) | 00000001 |
| L | 100000001 |
| Z | 000000101 |
| R | 000000001 |
| (2) | 0000000001 |
| W | 0000001001 |
| T | 00000010001 |
| (3) | 000000100001 |

As indicated above, the entity codes are simply the sequentially-arranged codes of their respective component strokes. The entity codes are as follows:

| Entity | Code |
|---|---|
| DPB | 01100111 |
| DPBB | 0110011111 |
| GBDGE | 1011101101001 |
| VUE | 000110000101001 |
| BBBBDPB | 1111111101100111 |
| JLD | 00001110000000101 |

Referring to Fig. 1, each of the cards 74 is provided with an H–electromagnet, there being 70 electromagnets H1 to H70 in all. The magnets are connected respectively to terminals T1 to T70. The energization of the magnets to move the cards for releasing a selected locator rod is hereinafter described in detail, but the procedure may be briefly summarized as follows. Upon the depression of the first symbol key on the keyboard 44, the first digit of the corresponding symbol code is entered by energizing the magnet H1 if the digit is a "1," the second digit by energizing the magnet H2 if it is a "1" and so on successively for as many digits (up to 17) as there are digits in the particular code. When an H–electromagnet is energized it moves its corresponding card to the "1" position as previously described.

When the second symbol key is depressed, a similar corresponding code entry is made in the cards 74, but the first digit of the second code is entered at the card next following the last card registering a digit of the preceding code, which in any case is a "1." The third symbol key adds a third code to the register, and so on. Eventually, all of the cards interfering with pins on the selected locator rod are moved to the proper positions to release the rod. But since the assembled code of each ensemble is unique, no other locator rod can be released.

The circuits for energizing the terminals T1 to T70 from the keyboard will next be described in detail.

*Binary symbol entry*

In the circuit diagrams described below, the relay contacts are illustrated in the positions corresponding to the unenergized conditions of their corresponding coils.

Fig. 2 shows the stroke keys and special instruction keys 46 (Fig. 5) along the right-hand margin and the entity keys 48 in the lower portion of the drawing. When battery is connected with the circuit a relay G1 is energized through break contacts of a relay G3. Each key is provided with make contacts that connect ground to a lead K0 (bottom of Fig. 2), causing energization of the relay G3. After energization of the relay G3, the relay G1 holds through its own make contacts and break contacts of a relay G2.

Other contacts of a selected key connect ground through make contacts 91 of the relay G1 to energize one or more of a group of 17 relays A1 to A17, these latter relays comprising a "binary symbol entry." It will be observed from the circuit connections illustrated in Fig. 2 that the relays A1 to A17 represent the first digit to the seventeenth digit, respectively, of the binary symbol codes of the corresponding strokes, entities, and instructions. A digit "1" in a symbol code in the lists given above designates that the corresponding binary symbol entry relay is energized while a digit "0" designates that the corresponding entry relay is not energized when the key is depressed.

Figure 3:
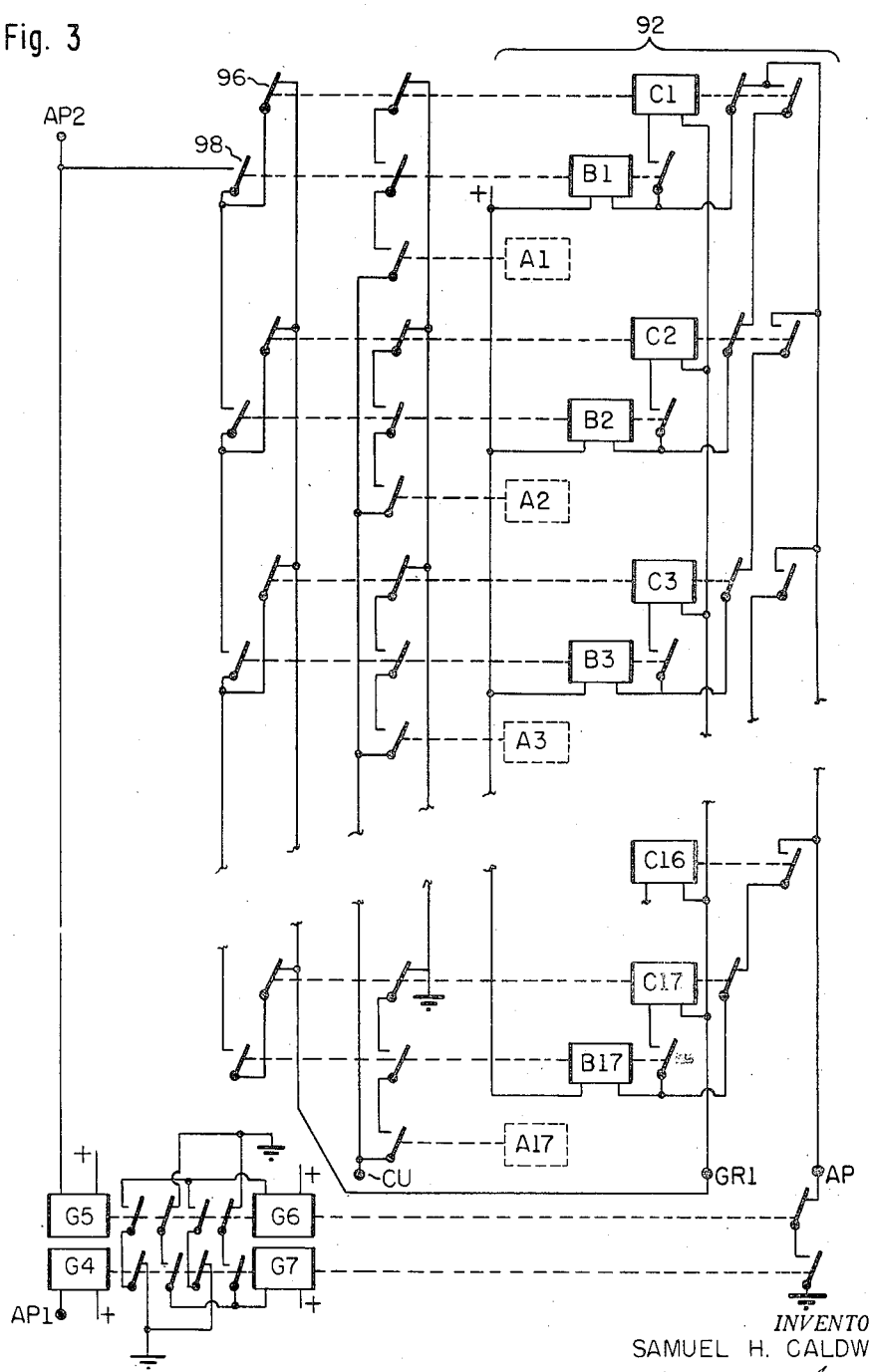
Fig. 3 is a circuit diagram of the symbol clock and related circuits.

Energization of any one or more of the A-relays connects ground through parallel contacts thereof to a terminal GR1. This causes the relay G2 to be energized, which in turn opens the holding circuit for the relay G1, whereby the latter is deenergized. Deenergization of the relay G1 then opens the A-relay energizing circuits through the contacts 91. However, the A-relays are not deenergized because each is provided with a holding circuit through its own make contacts and break contacts of a corresponding C-relay (Figs. 2 and 3).

The connection of ground to the terminal GR1 (bottom of Fig. 2) as previously described produces a series of actions leading ultimately to movement of a combination of the cards 74 (Fig. 1) corresponding to the combination of A-relays that are energized. These actions are not influenced by the release of the selected stroke or entity key, which deenergizes the relay G3 and thereby closes a circuit to reenergize the relay G1 preparatory to selection of a subsequent key.

The circuit described above may be considered as composed of three groups of elements with a definite function assigned to each group. Thus the keys 46 and 48 have the function of transforming an operator's selection of a stroke, entity or instruction into the appropriate binary code which represents the selection. The relay group A1 to A17 has the function of temporarily storing the code specified by an operated key. In the further description which follows it will be seen that the code stored in relays A1 to A17 is transferred digit by digit to another storage. The group of relays $G_1$, $G_2$, $G_3$ act collectively as a monitor group with the particular function of preventing duplicate transmission of a selected code. The reading out of the digits in the relays A1 to A17 is so rapid that it is possible, without the G1 to G3 monitor group, to have a complete code transmitted before the operator releases the key, whereupon the relays A1 to A17 would respond a second time to the same key code. In the circuit of Fig. 2, however, as soon as relays A1 to A17 respond to a key code, the monitor group removes the ground required for establishing a code, by opening the contacts 91, and will not restore that ground until the key has been fully released and the relays A1 to A17 have been cleared of all stored digits.

It should also be noted in Fig. 2 that the terminal GR1 is grounded whenever any of the A1 to A17 relays are operated. Since every code established by pressing a key has a binary "1" in its last digit position, when ground is removed from terminal GR1 it signifies that the entire code selected has been transferred out of the A1 to A17 relay storage.

*Clock circuits*

Figure 4:
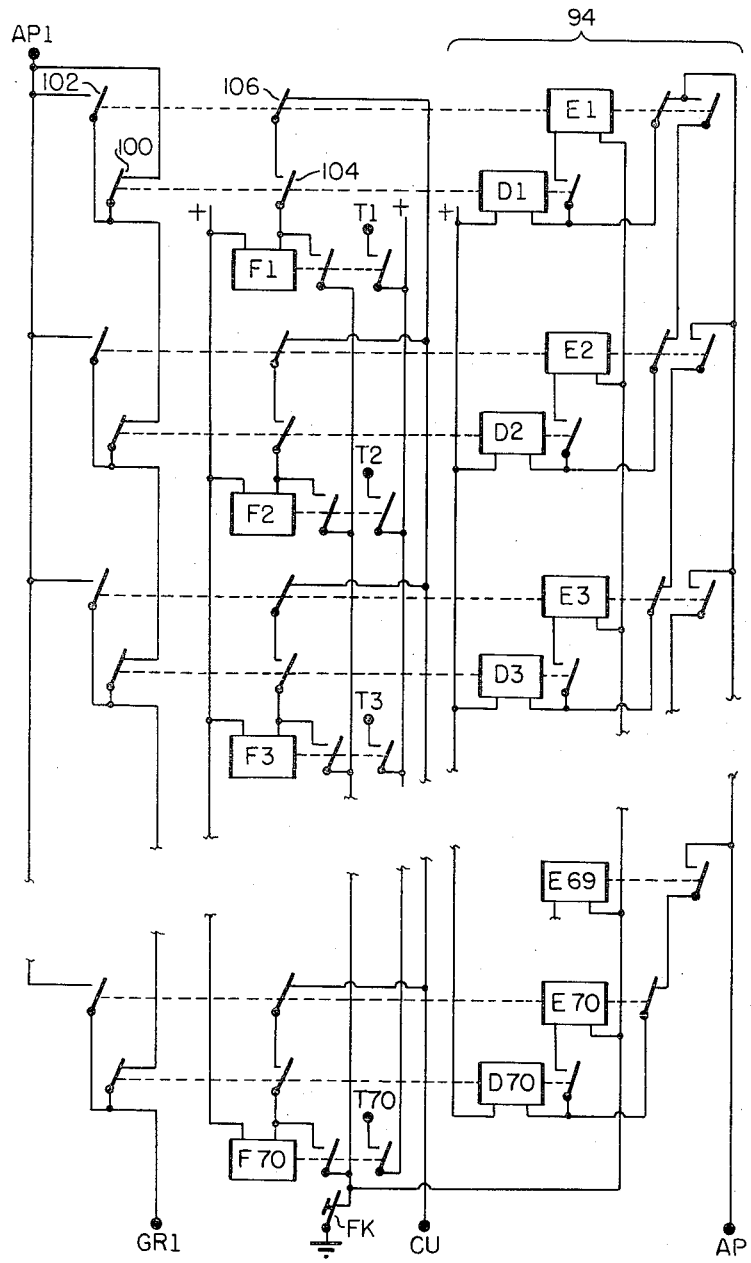
Fig. 4 is a circuit diagram of the ensemble clock and the relays actuating the binary ensemble register.

Referring to Fig. 4, left side, the ground supplied at the terminal GR1 is connected through break contacts of relays D1 to D70 in series to a terminal AP1. Referring to Fig. 3, bottom, this causes energization of a relay G4. This latter relay closes its make contacts to energize a relay G7 through break contacts of a relay G5. (It will be noted from Fig. 3 that when a relay B1 is energized at a later time, its contacts connect ground to a bus AP2 to energize the relay G5.) The relay G7 closes its make contacts to connect a terminal AP to ground through break contacts of a relay G6. This marks the beginning of a cycle of operation referred to below as a "clock interval" comprising two phases, a first phase during which ground is connected with the terminal AP, and a second phase following the first phase during which ground is disconnected from the terminal AP. A general description of the operation thus initiated will first be given, following which the specific circuits will be traced.

For each of the 17 available binary digits in a symbol entry there is a B-relay and a corresponding C-relay (Fig. 3). Relays B1 and C1 correspond to the entry relay A1, and so on. The B—C relay chain of 17 pairs of relays forms a "symbol clock" 92 that automatically steps (i.e., "counts") through a certain number of clock intervals when a symbol key is depressed, each clock interval consisting of two phases as previously described. At the start of the first phase of the first clock interval a relay B1 is energized; at the start of the second phase of the first clock interval a corresponding relay C1 is energized; at the start of the first phase of the second clock interval a relay B2 is energized; at the start of the second phase of the second clock interval a relay C2 is energized; and so on. Once energized, each B-relay and C-relay is not deenergized until as many full clock intervals have passed as there are digits in the particular symbol code, after which the counting stops and all B-relays and C-relays are simultaneously deenergized.

There is also provided a chain of relays D1 to D70 and E1 to E70 (Fig. 4) comprising an "ensemble clock" 94. The circuit of this clock is like that of the symbol clock 92 except that there is a D—E relay pair for each of the 70 cards 74 in the ensemble register. When the first symbol key designating an ensemble is depressed, the D—E relay chain begins to count in the same manner as, and simultaneously with, the B—C relay chain. However, when the two clocks have counted as many clock intervals as there are digits in the selected symbol code, the D—E relay chain merely stops counting and its previously-energized relays remain energized.

When the second symbol key is depressed, the B—C relay chain begins to count exactly as for the first symbol, while the D—E relay chain begins to count with the D—E relay pair next following the last pair previously energized.

It will be clear from the foregoing that the ensemble clock 94 ultimately steps through as many clock intervals as there are digits in the ensemble code. Through cooperation with the A-relays as the counting proceeds, this clock causes successive energization of selected F-relays (Fig. 4) which in turn energize corresponding H-electromagnets (Fig. 1).

The specific circuits involved in the operation of the symbol and ensemble clocks are described in relation to the two phases of each clock interval, as follows.

*Phase 1.*—Connection of ground to the terminal AP as described under the preceding sub-heading causes energization of the relay B1 through break contacts of the relay C1 (top of Fig. 3). The connection of ground to the terminal AP also results in energization of the relay D1 through break contacts of the relay E1 (Fig. 4). The relay B1 closes a circuit (Fig. 3) to energize the relay G5. This circuit is connected from the terminal GR1 (now grounded) through break contacts 96 of the relay C1 and make contacts 98 of the relay B1. At substantially the same time, energization of the relay D1 opens its break contacts 100 (Fig. 4) to disconnect the terminal AP1 from ground, thereby deenergizing the relay G4 (Fig. 3). With either the relay G5 energized or the relay G4 deenergized, the now-energized relay G7 holds through break contacts of the relay G6. However, when both of these conditions occur the relay G6 is energized; hence, break contacts of the latter in the holding circuit of the relay G7 open to cause the latter relay to become deenergized. Deenergization of the relay G7 opens its make contacts to disconnect ground from the terminal AP.

*Phase 2.*—Referring to Fig. 3, it will be noted that one lead from the relay C1 is grounded through the terminal GR1, while the other lead is connected with make contacts of the relay B1. When these latter contacts are closed during the phase described in the preceding paragraph, ground is connected with both leads of the relay C1. The terminal AP is grounded and this terminal is connected through break contacts of the relay C1 and make contacts of the relay B1 to one lead from the relay C1, while the other lead is grounded through the terminal GR1. The disconnection of ground from the terminal AP at the end of phase 1 therefore results in energization of the relay C1, the energizing current passing from the battery through the coil of the relay B1, make contacts of the relay B1, the coil of the relay C1, and the terminal GR1, to ground (Fig. 2). Referring to Fig. 3, energization of the relay C1 opens its break contacts 96 to deenergize the relay G5. Break contacts of the relay C1 open the holding circuit of the relay A1 (Fig. 2) and cause the latter to be deenergized. Referring to Fig. 4, disconnection of the terminal AP from ground also causes energization of the relay E1 through the coil of the relay D1 in the same manner as described for the relay C1. Make contacts 102 of the relay E1 close to connect the terminal GR1 (now grounded) with the terminal AP1, thereby energizing the relay G4 (Fig. 3). With either the relay G5 deenergized or the relay G4 energized, the relay G6 holds through its own make contacts and break contacts of the relay G7. However, when both of these conditions occur the relay G7 is energized, thereby causing the relay G6 to be deenergized. This marks the end of the second phase of the first clock interval, after which the first phase of the second clock interval is automatically initiated.

During the first phase of the second clock interval, the relays B2 (Fig. 3) and D2 (Fig. 4) are energized while the relays B1, C1, D1 and E1 remain energized. The relays G4, G5, G6 and G7 respond as in the first phase described above. During the second phase, the relays C2 and E2 are energized and the relays G4, G5, G6 and G7 respond as in the second phase described above.

The process continues in this cyclic fashion with the relays in the symbol clock 92 and the ensemble clock 94 being progressively and cumulatively energized, until the last A-relay that was energized by the key circuit has been deenergized by the opening of its holding circuit as described in phase 2. This disconnects the terminal GR1 from ground (Fig. 2) and deenergizes all of the B—C relays (Fig. 3). The D—E relays are not deenergized because they are grounded through a normally-closed key FK (Fig. 4). Since the relay G4 is grounded through the terminal AP1, this relay is deenergized because the terminal AP1 is grounded through the terminal GR1 (Fig. 4). Referring to Fig. 3, deenergization of the B and C relays opens the contacts 98, preventing energization of the relay G5. This occurs following the second phase of a clock interval and the relay G6 therefore remains energized while the relay G7 is deenergized.

Ensemble registering circuit

Referring to Fig. 4, each of the relays F1 to F70 has make contacts connected with a corresponding terminal T1 to T70 (see also Fig. 1). Thus energization of any F-relay causes energization of a corresponding H-electromagnet and movement of one of the cards 74. There is an F-relay for each pair of D and E relays in the ensemble clock 94. An F-relay can be energized only upon connection of a terminal CU with ground during the first phase of a particular clock interval in which the corresponding D-relay is energized and the corresponding E-relay is deenergized. For example, in the case of the relay F1 the energizing circuit includes make contacts 104 of the relay D1 and break contacts 106 of the relay E1, the latter being connected with the terminal CU. The circuit for grounding the terminal CU is shown in Fig. 3. This figure shows a number of parallel-connected circuits, each comprising three pairs of contacts in series. The contacts are so arranged that the terminal CU is grounded only during the first phase of each clock interval in which a corresponding A-relay is energized. Thus if the relay A1 is energized, when the first symbol key is struck, the terminal CU will be grounded during the first phase of the first clock interval, whereby the relay F1 (Fig. 4) will be energized. This will advance the first card 74 (Fig. 1) to the "1" position through energization of the electromagnet H1. If the relay A2 is not energized, the terminal CU will not be grounded during the first phase of the second clock interval and the relay F2 energizing circuit will not find a path to ground through the terminal CU. If the relay A3 is energized it will cause the relay F3 to be energized during the first phase of the third clock interval, and so on.

The action of the circuits shown in Figs. 3 and 4 and traced out above may be described functionally. When an input code is ready for transfer to the F relays and thence to the barrier cards 74, a ground appears on the terminal GR1. This ground initiates the clock action and the action continues until the release of the last A-relay removes the GR1 ground. The function of the clock is first to make temperary connections between contacts associated with an A-relay and an operating terminal of an F-relay so that if the A-relay is operated and contacts temporarily closed cause the F-relay to operate. The second clock function is to ensure that these temporary connections are made between the correct A and F elements. The relay group G4, G5, G6, G7 monitors and controls the clock phases, and provides that the transfer of information from the A-relays to the F-relays occurs at maximum speed. An alternate way to provide clock action is to apply an intermittent ground on the terminal AP through an auxiliary interrupter. If this is done, the period of each half cycle of the AP ground must be long enough to ensure that all relay action required during each clock phase is completed. This means that the slowest element in the B, C, D and E relays must be accommodated.

In the system described above and shown in Figs. 3 and 4 the monitor group G4 to G7 receives a feedback signal on the AP2 terminal which indicates when a B or a C relay operates, and another feedback signal on the AP1 terminal which indicates when a D or an E relay operates. The monitor group removes the AP ground as soon as both a B and a D relay are operated, regardless of the relative speeds of these two relays, and it reapplies the AP ground when the next C and E relays are both operated. Thus, the monitor group ensures that both clocks operate in synchronism and because of the feedback feature it ensures that the clock advances at its self-determined maximum speed.

It will be understood that the number of clock intervals that occur in response to selection of each symbol key equals the number of binary digits in the code corresponding to that key. Thus for a key having a five-digit code there will be five clock intervals before the last energized A-relay is deenergized to disconnect the terminal GR1 from ground. Since the last digit of any code is a "1," deenergization of the last A-relay disconnects ground from the terminal GR1 to signal the completion of a code entry. This produces a steady-state condition as described above, which continues until the next key is depressed.

The response of the clocks to depression of the next symbol key is substantially the same, except that initially there are as many pairs of relays in the ensemble clock 94 in the energized condition as there were binary digits in the code corresponding to the previously-selected key, or in the accumulated total of binary digits from all previously selected keys. Hence, in the first phase of the first clock interval, the D-relay that is energized is the first D-relay in the chain following the last D-relay previously energized. If the relay A1 is energized at this time, the F-relay that will be energized in response thereto will be that which corresponds to the D-relay first to be energized. Therefore, the codes entered by movement of the cards 74 are placed one beside the other. As previously indicated, it is necessary to actuate not more than 70 cards in order to distinguish any of the possible ensembles from the others on the support 12.

It will be apparent that in any case the necessary number of clock intervals for selection of a given ensemble equals the number of pins in the corresponding locator rod 66. Following that number of clock intervals the rod is automatically released and further keyboarding is ineffective.

Upon release of the desired rod 68, suitable mechanism within the housing 52 (not shown) elevates and laterally displaces the seeker 62 as previously described until the released rod arrests it in the position illustrated in Fig. 1 with respect to the selected rod. This locates the corresponding character 14 in the optical system. If the operator finds that this is the desired character, the shutter 42 is operated to expose the film 30. After exposure of the character, the seeker 62 is moved back to its initial position as previously described. A key K is then closed to energize the magnet 72 which moves the selected rod back to its original position. After the rod reaches its original position, the key FK (Fig. 4) is opened to release all energized F and D-E relays. This deenergizes the corresponding H-electromagnets and returns all of the cards 74 to their "0" positions. The key K (Fig. 1) is then opened to allow the plate 70 to return to its illustrated position.

*Mechanical ensemble registering device*

Figure 7:
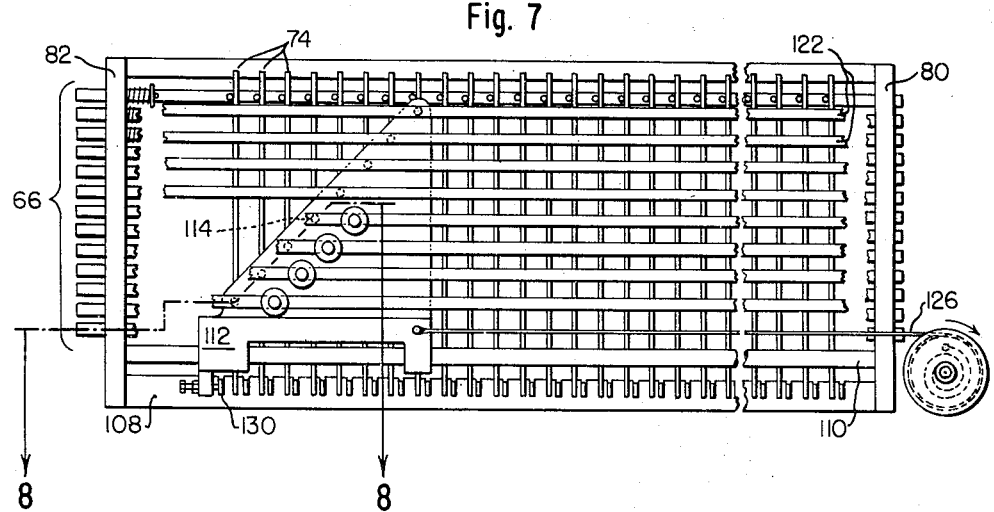
Fig. 7 is a side elevation, partially broken away, of an alternative form of locator assembly actuating mechanism.

In the embodiment of the invention described above an H-electromagnet is provided for each of the 70 cards 74 comprising the ensemble register. Relay clocks 92 and 94 are provided to produce the successive binary code entries whereby each code immediately follows the preceding code regardless of the number of digits in the latter. If desired, the proper location of successive code entries in the cards may be produced by an alternative mechanical device as illustrated in Figs. 7 and 8. The locator assembly in this case includes the end plates 80 and 82, the 70 cards 74 slidably received in a slotted base member 108, and the rods 66 each corresponding to a separate ensemble, all as described with reference to the preceding embodiment.

In place of the H-electromagnets, however, there is provided a pair of fixed guide rods 110 slidably supporting a triangular-shaped carriage 112. This carriage supports a set of 17 interference pins such as 114, the pins being displaced longitudinally the same distance relative to one another as the cards 74. (For clarity only eight pins are shown in the drawing.) They are slidably supported in an upstanding wall portion 116 integral with the base portion of the carriage 112. Each pin is provided with a compression spring such as 118 and a collar 120 whereby the pin is normally urged to a right-hand extremity as illustrated.

Seventeen vertically-spaced actuator bars 122 are supported adjacent the carriage 112, each bar extending the length of the locator assembly and being adapted to move laterally in the direction of the cards. A set of stationary electromagnets 124, one for each of these bars, produce lateral movement thereof, i.e., to the left as viewed in Fig. 8. It will be appreciated that mechanical means may be used in place of the electromagnets. Only eight bars are shown in the drawing to avoid confusion.

A spring 126 applies constant tension tending to urge the carriage 112 in the direction toward which the rods 66 are released for ensemble selection.

Prior to the first symbol key selection for a desired ensemble the carriage 112 is in the position illustrated in Figs. 7 and 8, whereby a stop screw 128 threaded therein is arrested by a slide member 130 received in a transverse slot in the base member 108. A compression spring 132 urges the slide 130 in the appropriate direction to release the carriage 112, but a projection 134 on the slide is restrained by a lever 136, the lever 136 being in turn urged by a compression spring 138 clockwise against a fixed stop pin 140. Similarly, all the other illustrated slides similar to the slide 130 are restrained in their illustrated positions by corresponding levers. Therefore, the pins such as 114 on the carriage 112 are positioned opposite the first 17 cards in the selector 64. (As previously stated, Figs. 7 and 8 show only eight pins, whereas in the actual machine there are nine additional pins. However, the arrangement will be clear from the drawing.)

The electromagnets 124 (Fig. 8) are preferably connected with the keyboard circuit of Fig. 2 in place of the A-relays, whereby an electromagnet 142 is substituted for the relay A1, an electromagnet 144 for the relay A2, and so on. Depression of a symbol key energizes a combination of the electromagnets 124, which move a corresponding combination of the bars 122 to depress the corresponding cards 74 to their "1" positions through the intermediate pins such as 114.

Following the movement of the cards 74, the carriage 112 automatically advances as described below to align the pins such as 114 thereon with the group of seventeen cards next following the last card that was depressed to its "1" position. It will be recalled that all of the symbol codes are terminated by the digit "1." The responsive movement of the carriage will be understood from consideration of an example in which the first selected symbol key is the "G" with a code "101." Striking of this key causes cards 146 and 148 to move to their "1" positions. The card 146 strikes a lever 150 which rocks counterclockwise against the force of a compression spring 152 and releases a slide 154. Under the action of a compression spring 156 the slide 154 moves leftwardly as viewed in the drawing until a projection 158 thereon strikes a lever 160. The lever 160 rocks and releases a slide 162 which strikes the lever 136, and which in turn releases the slide 130. The stop screw 128 on the carriage 112 is in position to strike those slides that are not released by their corresponding levers, but not those that are released. The depression of any card to its "1" position results in releasing all slides nearer the beginning of the ensemble code. Therefore the carriage 112 is free to move until the stop screw 128 strikes the first slide that has not been released, which in the present example is a slide 163. The responsive movement results in bringing a pin 164 opposite a card 166.

Following the release of the selected rod 68 after a number of stroke entries, the character is projected in the same manner as described for the preceding embodiment, after which the seeker 62 is retracted to its initial position, the released rod is moved back to its initial position, and the cards 74 are reset to their "0" positions by suitable manual or automatic means which may be similar in operation to the plate 70, for example. This device is omitted from the drawing for simplification. Following these steps, the released slides such as 162 are relatched by movement of a slide reset bar 168 by a suitable manual or automatic mechanism in the direction of the arrow. Each slide is moved until its abutment passes the associated lever, whereby retraction of the bar 168 allows the lever to restrain the slide.

*Special keys*

It is stated above that four special keys (A), (1), (2) and (3) are provided on the keyboard (Fig. 5) for certain ambiguous ensembles having similar symbol sequences. An ambiguity may arise in either of two ways: first, where the symbol sequence of one ensemble is the first part of the symbol sequence of another; and second, where the symbol sequences of two or more ensembles are identical.

The first type of ambiguity is represented by the ensembles shown in Figs. 9(a) and (b). That of Fig. 9(a) means "mouth" and includes the stroke sequence "DPB." That of Fig. 9(b) means "to disclose" and includes the stroke sequence "DPBBDB." From the foregoing description it will be clear that for either ensemble the entity key "DPB" is the first key to be struck. (Alternatively, the keys for the individual strokes D, P and B may be struck in succession to introduce the same code as the key "DPB.") However, provision must be made to prevent the resultant code alone from selecting the ensemble of Fig. 9(a) until it is determined whether that of Fig. 9(b) is intended. In this case, the code corresponding to Fig. 9(a) is simply modified by adding a termination instruction "(A)" to the symbol sequence whereby the code becomes "DPB(A)" and that ensemble is selected only when the keys "DPB" and "(A)" are struck in that order. The ensemble of Fig. 9(b) requires the striking of the keys "DPB" (or the component individual strokes), "B," "D" and "B" in that order.

The second type of ambiguity is represented by the ensembles shown in Figs. 9(c), (d) and (e). All three ensembles include the stroke sequence "PBS," but that of Fig. 9(c) means "personal," that of Fig. 9(d) means "already" and that of Fig. 9(e) means "the period from 9:00 A.M. to 11:00 A.M." It will be clear that striking the keys "P," "B" and "S" in that order should not release any locator bar until it is determined which ensemble is intended. To this end the codes are modified by adding the instructions "(1)," "(2)" or "(3)" to the respective symbol sequences, whereby the code corresponding to Fig. 9(c) becomes "PBS(3)," that corresponding to Fig. 9(d) becomes "PBS(2)" and that corresponding to Fig. 9(e) becomes "PBS(1)."

There are relatively few ensembles involving ambiguities such as the second type above, and the operator of the machine is preferably furnished with a list thereof which can be easily memorized. No special learning is necessary for non-ambiguous ensembles which are in the vast majority, since they are selected by stroke and entity keys alone.

From the foregoing description of the structure and operation of a preferred form of ideographic type composing machine according to this invention, it will be appreciated that the machine may be operated from a keyboard as described or from any other suitable circuit-operating means such as a perforated or magnetic tape, from punched cards, from a telegraphic or radio transmission circuit, or from other equivalent means. In any case, such circuit-operating means actuate a set of binary symbol entry units such as the A-relays (Fig. 2) or the electromagnets 124 (Fig. 8). The entries cause movement of a plurality of cards 74 or equivalent binary ensemble registering devices which cooperate with a plurality of rods 66 in a locator assembly 64. There is a rod 66 for each selectable ensemble. The release of a particular rod results in selection for photography of a corresponding ensemble situated in predetermined relationship to the rod on a support 12.

It will also be appreciated that the movement of the cards conforms with a binary code consisting of the serially-arranged binary codes of the component symbols entered at the symbol entry in the proper sequence to conform with standard writing practice.

The machine is therefore relatively easy to operate for one familiar with handwritten Chinese. It is only necessary to punch the keys corresponding to the various component symbols, and after sufficient keys are punched the machine automatically selects the proper ensemble for photography. Ordinarily, the operator stops the successive selection of keys when the desired ensemble automatically appears on the screen 40. Accordingly, it is not necessary for the operator to know how many keys need to be selected for a given ensemble, although in the usual case this will be fewer than the actual number of symbols therein.

Fig. 10 illustrates an alternative form of mechanism that may be substituted in the machine of Fig. 1 for the support 12 and the associated optical projection elements. With this substitution, the machine becomes a form of typewriter. In place of the support 12 with its photographic characters, a print bar support 12' is secured to the rods 50. The support 12' carries an array of rows and columns of individual print bars 172, each having an ensemble 14' expressed in relief on its end face. Each bar is also provided with a head 174, a compression spring 176 and a locking collar 178, thereby defining a normal retracted position for the bar and limiting its freedom of axial displacement. A hammer 180 is rotatably supported about a fixed axis 182 so that it may strike any print bar that is brought to a position corresponding to the optical axis 16 in Fig. 1. A gear segment 184 integral with the hammer 180 is engaged with a driving pinion 186, which in turn is rotated by any suitable means, not shown. A sheet of paper 30' is supported in position to be struck by the type 14' through a sheet of carbon paper 188, an inked ribbon or the like. The sheet 30' is displaced after each character is struck by the mechanisms 36 and 37 or any equivalent spacing mechanisms, substantialy as descirbe above.

If desired, the rods 66 and the associated selection circuits or mechanism of Fig. 1 may be used as a form of typewriter by expressing the character ensembles in relief on the ends of the corresponding rods. In that case, the rods are moved forward to strike through a suitable ribbon on a sheet supported over the reset plate 70. The sheet is preferably displaced after each character impression both horizontally and vertically by mechanism coupled with the seeker 62, to align and space the successive characters in accordance with the conventions of Chinese text.

While the invention has been described with reference to a preferred embodiment and an alternative thereof, it will be appreciated that various modifications thereof may be accomplished by one skilled in the art without departing from the spirit or scope of the invention.

Having thus described the invention, I claim:

1. In type composing apparatus, the combination of a support bearing an array of typographical characters arranged thereon with reference to a first pair of coordinates, a seeker coupled with the support, a number of movable locator elements, one for each character, the elements being spaced with reference to a second pair of coordinates in a manner corresponding to the spacing between the characters, mechanism for moving the seeker in relation to said elements and the characters in relation to a predetermined printing position, means to move the element corresponding to a selected character to a position to interfere with the seeker when said character reaches said position, and means for printing said character.

2. In type composing apparatus, the combination of a flat support bearing a number of rows and columns of typographical charcters thereon, a seeker coupled with the support, a number of movable locator elements, one for each character, the elements being arranged in rows and columns according to the arrangement of the characters, mechanism for moving the seeker in a direction having components along the rows and columns of elements and for moving the characters in relation to a predetermined printing position, means to move the element corresponding to a selected character to a position to arrest the seeker at a particular row and column when said character reaches said position, and means for printing said character.

3. In type composing apparatus, the combination of a number of individually movable locator elements arranged in rows and columns, a support bearing a typoraphical character for each element, a seeker fixed in relation to the support, mechanism for moving the seeker in a direction having components along the rows and columns of elements, means to move the element corresponding to a selected character to a position to arrest the seeker at a particular row and column, and means positioned opposite to the support and operative after the seeker is arrested to print said character from the support.

4. In type composing apparatus, the combination of a number of individually movable locator elements arranged with reference to a pair of coordinates, a support bearing a typographical character for each element, a seeker fixed in relation to the support, mechanism for moving the seeker in a direction having components along both of said coordinates, means to move the element corresponding to a selected character to a position to arrest the seeker at a particular position with reference to both of said co-ordinates, and means positioned opposite the support and operative after the seeker is arrested to print said character from the support.

5. Type selection apparatus comprising, in combination, a frame, a displaceable locator member for each typographical character, the members being slidably supported in the frame in a two-coordinate array, means tending to urge each member to displace toward an operative position, a plurality of barrier elements each arranged to intersect all of the locator members, each element having an aperture intersecting a number of members along one coordinate and being displaceable to either of two alternative positions along the other coordinate, each member having a number of portions adapted to interfere with a number of said barrier elements, each portion being adapted to interfere with an element in one or the other of the alternative positions of said element, said portions normally restraining the member from moving to the operative position, and binary code means for selecting a desired character including means to move to non-interfering positions the barrier elements interfering with said portions of the corresponding locator member.

6. A code entry system having, in combination, a binary register comprising a number of elements each representing a binary digit and having provision for actuation to either of two positions respectively representing a first binary digit value and a second binary digit value, and means to represent a composite binary code in said register consisting of means for successively actuating subgroups of said elements, said subgroups having variable numbers of digits, said means having provision to ascertain the last element of a subgroup previously actuated and to cause the next succeeding subgroup to begin with the next succeeding element.

7. A code entry system having, in combination, an entry circuit having portions respectively energizable to represent digits in a numerical code, a numerical register comprising a number of elements each representing a numerical digit, means to energize the entry circuit successively to represent a number of numerical codes having differing numbers of digits, connections from the entry circuit to the register, and means for shifting said connections after each energization to cause the digits of each successive energization to fall adjacent those of the preceding energization in the register.

8. Type composing apparatus having, in combination, a keyboard having a key for each of a plurality of strokes forming the elemental components of typographical characters, code means associated with the keys and adapted to represent a distinctive binary code for each selected key, a register to accumulate serially the codes corresponding to successive key selections which in turn correspond to successive strokes in a selected character, a movable matrix having the selectable characters arranged in coordinates, transcribing means for a character in a predetermined printing position, and means associated with said register to move said matrix to place said selected character in said position when the serially-accumulated codes of its component strokes produce a binary number distinct from that of any other character available for selection.

9. Type composing apparatus having, in combination, a keyboard having a key for each of a plurality of strokes forming the elemental components of typographical characters, code means associated with the keys and adapted to represent a distinctive binary code for each selected key, the codes for the keys varying in number of digits according to the frequency of use of their corresponding strokes, a register to accumulate serially the codes corresponding to successive key selections which in turn correspond to successive strokes in a selected character, a movable matrix having the selectable characters arranged in coordinates, transcribing means for a character in a predetermined printing position, and means associated with said register to move said matrix to place said selected character in said position when the serially-accumulated codes of its component strokes produce a binary number distinct from that of any other character available for selection.

10. Type composing apparatus having, in combination, a keyboard having a key for each of a plurality of strokes forming the elemental components of typographical characters, code means associated with the keys and adapted to represent a distinctive binary code ending in the digit "1" for each selected key, the codes for the keys varying in number of digits according to the frequency of use of their corresponding strokes, a register to accumulate serially the codes corresponding to successive key selections which in turn correspond to successive strokes in a selected character, a movable matrix having the selectable characters arranged in coordinates, transcribing means for a character in a predetermined printing position, and means associated with said register to move said matrix to place said selected character in said position when the serially-accumulated codes of its component strokes produce a binary number distinct from that of any other character available for selection.

11. Type composing apparatus having, in combination, a keyboard having a key for each of a plurality of strokes forming the elemental components of typographical characters, code means associated with the keys and adapted to represent a distinctive binary code for each selected key, and a register to accumulate serially the codes corresponding to successive key selections which in turn correspond to successive strokes in a selected character.

12. Type composing apparatus having, in combination, a keyboard having a key for each of a plurality of strokes forming the elemental components of typographical characters, code means associated with the keys and adapted to represent a distinctive binary code for each selected key, a frame, a number of movable members each corresponding to a character and supported in the frame, means tending to impart motion to said members, and means to control the motion of the members according to the character selected including a plurality of barrier elements arranged transversely of the members, each member having a portion to interfere with an element, each element being movable to either of two alternative positions whereby it interferes with one of said portions of a given member in not more than one of said positions, means associated with said code means for moving a portion of the elements corresponding to digits in the code of the first stroke in a selected character, and means for moving another portion of said elements corresponding to digits in the code of a succeeding stroke in said character, whereby after a plurality of keys are selected all of said elements are moved to non-interfering positions with reference to the member corresponding to said character.

13. Type composing apparatus having, in combination, a keyboard having a key for each of a plurality of strokes forming the elemental components of typographical characters, code means associated with the keys and adapted to represent a distinctive binary code for each selected key, a frame, a displaceable locator member for each typograchical character, the members being slidably supported in the frame, means tending to urge each member to displace toward an operative position, a plurality of selectively displaceable apertured barrier elements each arranged to intersect all of the locator members, the members passing through the apertures of said elements, each member having a number of portions adapted to interfere with a number of said barrier elements, said portions normally restraining the member from moving to the operative position, means associated with said code means for moving a portion of the elements corresponding to digits in the code of the first stroke in a selected character, and means for moving another portion of said elements corresponding to digits in the code of a succeeding stroke in said character, whereby after a plurality of keys are selected all of the elements are moved to non-interfering positions with reference to the member corresponding to said character.

14. Type composing apparatus having, in combination, a keyboard having a key for each of a plurality of strokes forming the elemental components of typographical characters, code means asociated with the keys and adapted to represent a distinctive binary code for each selected key, a frame, a displaceable locator member for each typographical character, the members being slidably supported in the frame, means tending to urge each member to displace toward an operative position, a plurality of selectively displaceable apertured barrier elements each arranged to intersect all of the locator members, each element being displaceable to either of two alternative positions, the members passing through the apertures of said elements, each member having a number of portions adapted to interfere with a number of said barrier elements, said portions being adapted to interfere with some elements when the latter are in one alternative position and with other elements when the latter are in the other alternative position, said portions normally restraining the member from moving to the operative position, means associated with said code means for moving a portion of the elements corresponding to digits in the code of the first stroke in a selected character, and means for moving another portion of said elements corresponding to digits in the code of a succeeding stroke in said character, whereby after a plurality of keys are selected all of the elements are moved to non-interfering positions with reference to the member corresponding to said character.

References Cited in the file of this patent

UNITED STATES PATENTS 2,639,017    Crocher    May 19, 1953

FOREIGN PATENTS 418,877    Great Britain    Nov. 1, 1934